(12) United States Patent
Kuniholm et al.

(10) Patent No.: US 12,193,560 B2
(45) Date of Patent: Jan. 14, 2025

(54) PRESSURE-RELIEVING FLEXURAL LOAD BEARING STRAP

(71) Applicant: Stumpworx LLC, Portland, OR (US)

(72) Inventors: Jonathan Kuniholm, Portland, OR (US); Zachary Meyer, Portland, OR (US)

(73) Assignee: Stumpworx LLC, Portland, OR (US)

( * ) Notice: Subject to any disclaimer, the term of this patent is extended or adjusted under 35 U.S.C. 154(b) by 0 days.

(21) Appl. No.: 18/426,108

(22) Filed: Jan. 29, 2024

(65) Prior Publication Data

US 2024/0164509 A1 May 23, 2024

Related U.S. Application Data

(62) Division of application No. 17/494,828, filed on Oct. 5, 2021, now Pat. No. 11,950,685.

(60) Provisional application No. 63/087,497, filed on Oct. 5, 2020.

(51) Int. Cl.
  *A45F 3/14* (2006.01)
  *B32B 38/04* (2006.01)
(52) U.S. Cl.
  CPC .............. *A45F 3/14* (2013.01); *B32B 38/04* (2013.01); *A45F 2003/144* (2013.01)
(58) Field of Classification Search
  CPC ....... A45F 3/14; A45F 2003/144; B32B 38/04
  See application file for complete search history.

(56) References Cited

U.S. PATENT DOCUMENTS

| | | | |
|---|---|---|---|
| 6,401,786 B1* | 6/2002 | Tedeschi | A41F 15/00 156/251 |
| 2011/0197341 A1* | 8/2011 | Formica | B32B 3/30 2/209.3 |
| 2012/0037674 A1* | 2/2012 | Crandall | A45F 3/12 224/257 |
| 2017/0020270 A1* | 1/2017 | Pactanac | A45F 3/04 |
| 2017/0238638 A1* | 8/2017 | Flockton | A41F 15/00 |
| 2017/0274167 A1* | 9/2017 | Huddart | A61M 16/0683 |
| 2019/0091094 A1* | 3/2019 | Romo | B25J 9/0006 |

* cited by examiner

*Primary Examiner* — Cynthia L Schaller
(74) *Attorney, Agent, or Firm* — Kolitch Romano Dascenzo Gates LLC

(57) ABSTRACT

A method for forming a textile strap including a textile matrix formed by stacking at least one first material layer atop at least one second material layer in alternating order. The at least one first material layer is bonded to the at least one second material layer in a manner to fix the at least one first material layer to the at least one second material layer. A plurality of apertures are cut into the formed textile matrix inward from an edge of the textile matrix, such that the textile matrix with defined apertures is predictably flexible in each of two directions. The textile matrix with defined apertures is sheathed in a stretch outer layer configured to substantially enclose the textile matrix with defined apertures. The stretch outer layer is bonded to the textile matrix.

15 Claims, 7 Drawing Sheets

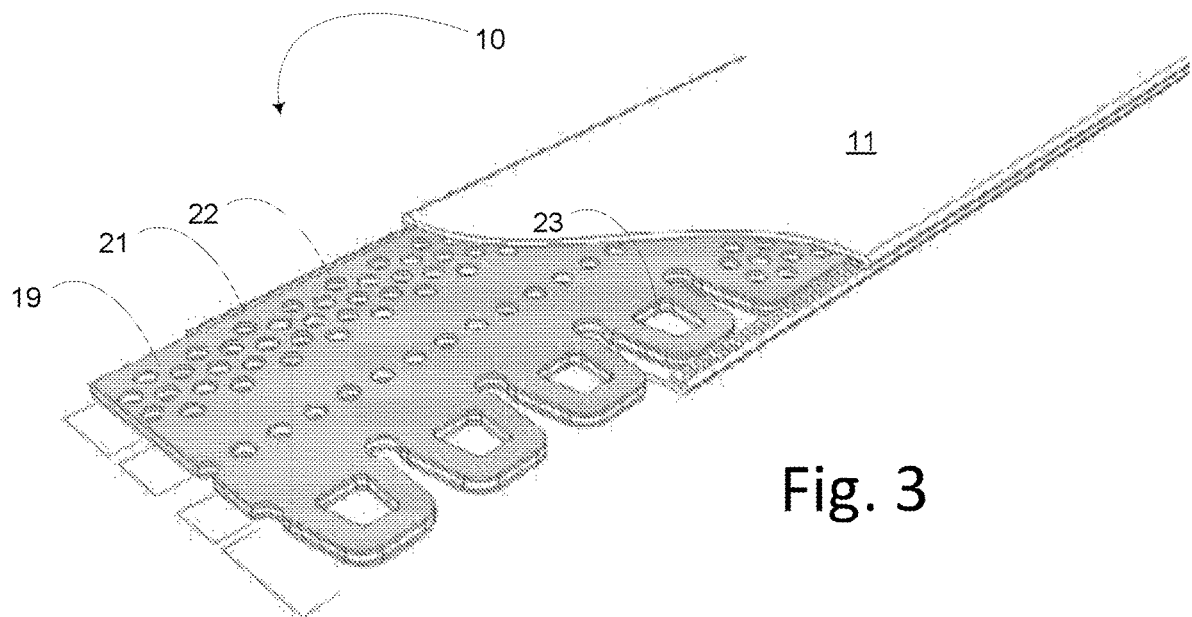
Fig. 3
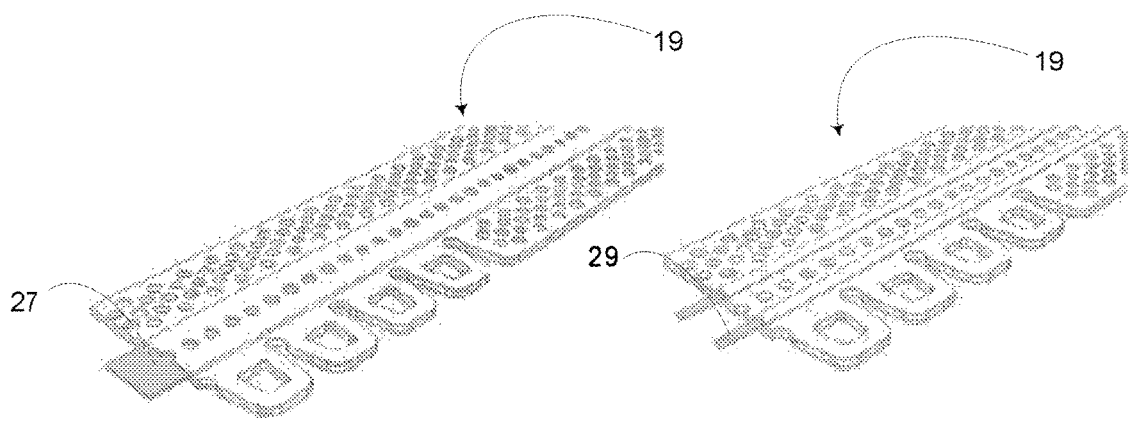
Fig. 4
Fig. 5

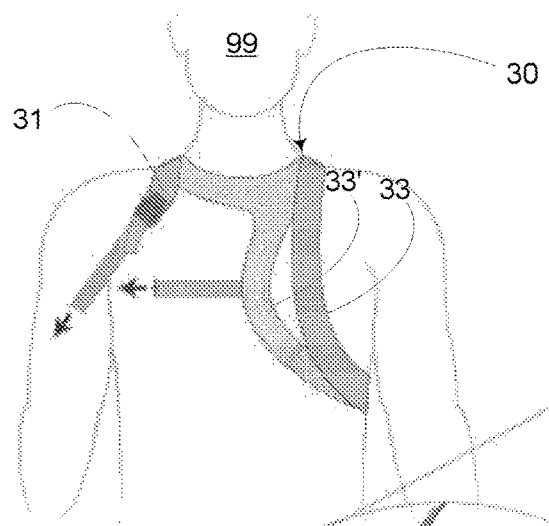
Fig. 11A
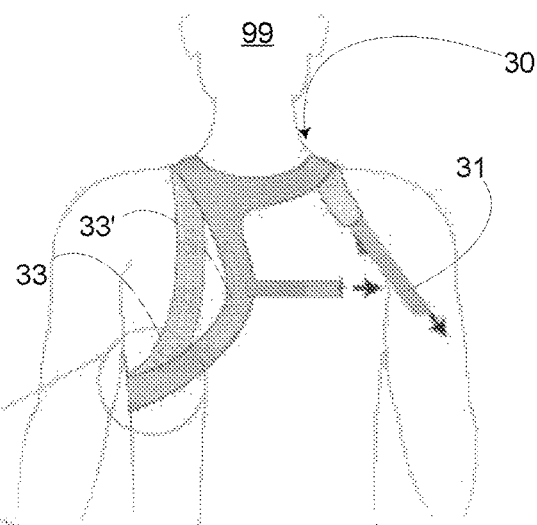
Fig. 11B
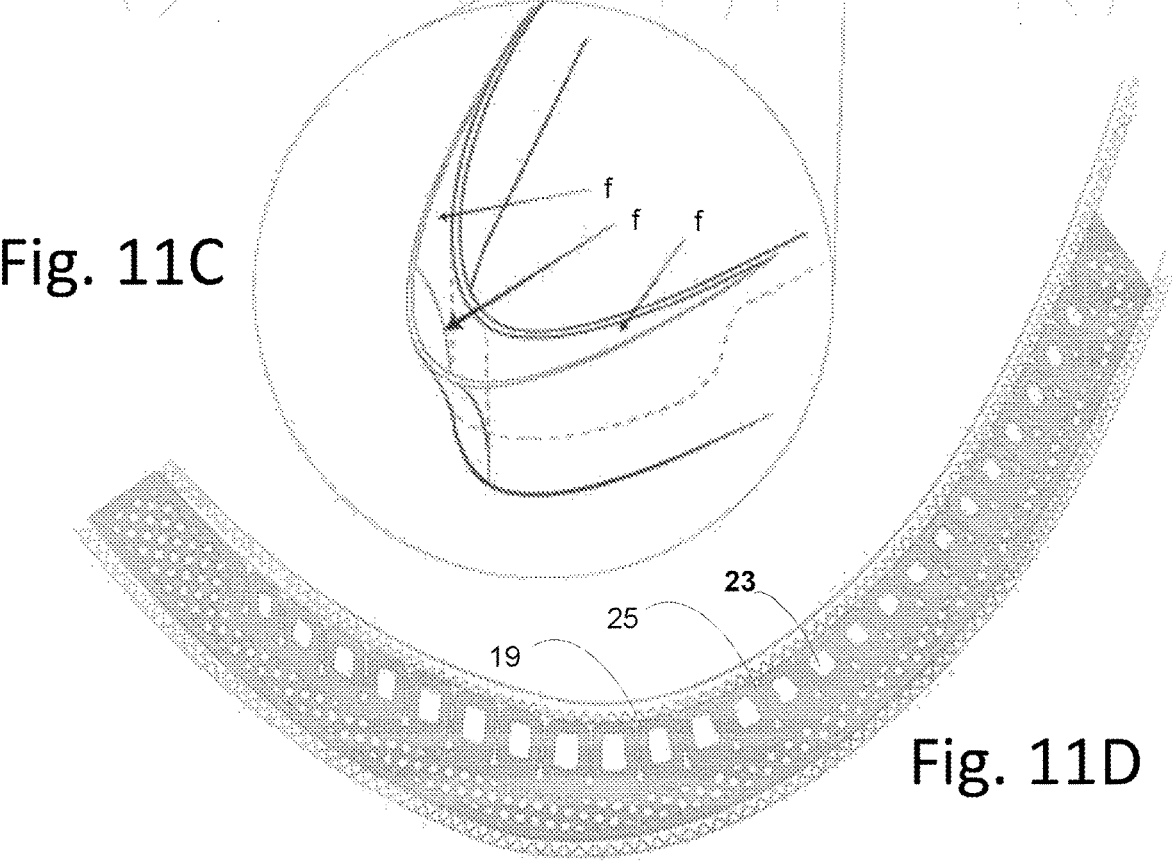
Fig. 11C
Fig. 11D

PRESSURE-RELIEVING FLEXURAL LOAD BEARING STRAP

RELATED APPLICATIONS

This application is a divisional of U.S. Non-Provisional patent application Ser. No. 17/494,828, which was filed on Oct. 5, 2021, is entitled "PRESSURE-RELIEVING FLEXURAL LOAD BEARING STRAP AND METHOD FOR MANUFACTURING SAME," and claims priority to U.S. Provisional Patent Application No. 63/087,497, which was filed on Oct. 5, 2020, and which is entitled "PRESSURE RELIEVING FLEXURAL LOAD BEARING STRAP AND METHOD FOR MANUFACTURING SAME," the complete disclosures of which are incorporated herein by reference.

FIELD OF THE INVENTION

The method for construction of and a resulting a load bearing strap in intimate contact to a living body, and specifically relates to a load bearing strap assembly component of a harnessing system.

BACKGROUND

Human beings do not comfortably bear burdens bearing against their bodies, especially those using one or more straps concentrating weight of a load into a narrow band situated over skin and muscle, which drives the weight against underlying bones. Straps conventionally designed for load bearing are generally located where the body can most comfortably bear weight. Even so, when loads are large, the interval over which a load must be borne exacerbates any effects of that burden, which over time can cause supporting tissue to become painful and fatigued, particularly at the edges of these straps where the underlying tissue transitions to supporting a load.

While wider straps distribute the load more effectively, when designed to be very wide in order maximally distribute a load, those straps can restrict motion. Thus, when using such straps, rather than enabling more natural movement, the wider strap impedes the movement of the body. Straps can also provide relief from the weight of a load with added thicknesses of padding, which also can impair movement and function when padded straps are layered under clothing or other straps.

By way of nonlimiting explanatory example, in the case of military load bearing equipment, multiple loads consisting of body armor, ammunition and equipment are hung on harnesses and backpacks which must all be supported by the shoulders and hips. In the case of such harnesses, the design and construction of these various straps, combined with the magnitude of the load itself, can greatly impact a soldier's mobility and therefore the survivability of those mobility-impaired soldiers.

Similarly, duty belts worn by police are another such example as they are tasked with holding handcuffs, batons, radios, pistols in holsters, pepper spray, notebooks, and more bulky items. These police devices are usually attached to a thick leather or synthetic belt, that fails to account for the ergonomics of the hip bones with which they are intended to interface. Existing solutions consist of plates and pads that are added to, rather than integrated with, such a belt. These pads serve to increase its bulk and mass (U.S. Pat. No. 8,998,053B2). Traditional duty belts poorly distribute loads, and cause back and shoulder pain, numbness and sores from long hours of heavy use and movement. Police officers cite problems similar to those cited by the military in terms of the comfort of heavy loads, bulky and non-ergonomic equipment, and interference among pieces of equipment, the body, and with the external environment-vehicle seats, for example.

Still another nonlimiting example is presented in safety rigging for recreational and competitive ice and rock climbing, media production, construction, cleaning or arborist work. People using such equipment sometimes spend long hours either wearing or suspended from torso or seat harnesses and can suffer fatigue and pain as a result. "Suspension trauma (also known as "harness-induced pathology" or "orthostatic shock while suspended")," possibly caused by the pressure of harness loops on blood vessels, has led to loss of consciousness or other symptoms and, in some cases, ultimately blamed for fatal accidents in mountaineering, for example.

Nearly half of all arm amputees either reject or have never worn a prosthetic arm. Most users reject the prothesis due to irritation of pain related to attachment of the prothesis to the body. Issues include poor heat and moisture management as well as harness discomfort at support sites. Users voice significant specific complaints related to the comfort of wearing an upper limb prosthesis and a body-powered harness is a component of the most commonly used type. Similar harnesses consisting of belts or thigh straps are used for the attachment of some lower limb prostheses. Discomfort in wearing of the harness is the most frequently cited objection to the device. Yet it is the harness that provides both the control functionality and the superior tensile load-bearing capability of the body-powered arm. Reasons for rejecting harnessing include axillary pressure and neuropathy, bulkiness, appearance over clothing or comfort under it, and odor generated from repeated wearing (even despite cleaning). Indeed, the most common criticisms of even the most advanced prosthetic arms tend to surround the suspension of the devices rather than the devices themselves. For this reason, improvements in prosthetic harnessing stand to address a significant portion of the defects in comfort that remain obstacles to their acceptance and use by patients.

In sum, the shortcomings and risks of the straps and belts of load bearing harnesses are nearly universal in every area of application. Complaints include, beyond mere pressure on the tissues of the body but also that the edges of the straps cut and dig into the body, edges and features of items attached to the straps doing the same. It is known that thin straps are unable to properly distribute an exemplary load. Additionally, when straps lack the proper contour in two or three dimensions to properly conform to the shape of the body, the straps themselves are driven into supporting flesh. The action of straps that do not conform to the body as they are used, leads to direct pain, often in particularly uncomfortably places. Thus, these irritations of the users' body in bearing of such loads as well as any indirect pain caused by bodily compensation for improper loading, become unavoidable in the carrying of loads. Similarly, the additional pads and straps used routinely fail to breathe and to transport moisture away from any chaffing surface, accelerating irritation of the loading site on the body, thereby compounding the problems related to the wearing of the straps. What is needed in the art is a form of strap that does conform to the body and includes the ability to transport moisture from any bearing surface as against the body of the wearer.

SUMMARY

A load bearing strap assembly component of a harnessing system, is presented to include a textile component, designed for comfortable and unobtrusive fit of an article harnessed to the body. A method for forming a textile strap and the resulting textile strap includes forming a textile matrix by stacking in alternating order at least one first material layer on at least one second material layer. The at least one first material layer is bonded to the at least one second material layer in a manner to fix the at least one first material layer to the at least one second material layer. A plurality of apertures are cut into the formed textile matrix. The apertures are cut in from an edge of the textile matrix inward such that the resulting textile matrix with defined apertures is predictably flexible in each of two directions. The resulting textile matrix with defined apertures is sheathed in a formed stretch outer layer configured to substantially enclose the resulting textile matrix with defined apertures. The stretch outer layer is bonded to the textile matrix.

The assembly includes at least one inner textile portion and at least one outer textile component, each of which features wicking qualities and has stretch in either of the lengthwise or crosswise directions or both directions. Between these two layers is at least one laminated component, bonded using heat-set sheet glues and engineered in its layering to be non-stretch, and which can also vary in its stiffness. The textile component is composed of a stack of materials that match the load prescribed by the application. A suitably formed textile component is cut or perforated to allow a gradient of stretch across a region or zone of the component. Cut apertures are arrayed along opposing edges of the textile component are defined across a lengthwise region of the strap and may vary over a crosswise distance from the edge. The cut apertures are configured to remove material such that textile material that remains relieves the textile component in a manner such that stiffness of the resulting component presents a more gradual transition from the edge of the component inward to a medial portion of the component which is not so relieved. By removing material in specific geometric patterns selected to relieve the stiffness of the component such that amount of material that the apertures relieves stiffness in making the transition from edge to medial portion proportionately to the displacement from the component edge thereby minimizing the pain created by a stiff edge of a loaded strap, particularly where width the strap is limited.

Perforation and geometry of the laminated component can be selected in a manner to preserve the gradient of stretch in a zone proximate to the edge of the component and thereby to preserve the breathability and wicking of the textile components within all regions, including non-stretch zones.

The direction of the gradient of stiffness and the magnitude of stretch the textile component will facilitate in the inner and outer textile components depends on the article and location of application and may vary within a single article of application to better match the motion of the wearer in that area.

BRIEF DESCRIPTION OF THE DRAWINGS

Preferred and alternative examples of the present invention are described in detail below with reference to the following drawings:

FIG. 3 is a cut-away view of the textile strap of FIG. 1 in which the textile matrix defines apertures and perforations sheathed in a stretch outer layer according to the present disclosure;

FIGS. 4 and 5 show alternate embodiments of a textile matrix defining apertures and including alternatively strap and cable tensioning members of the textile matrix according to the present disclosure;

FIGS. 6, 6A, 6B, 6C, and 6D show an arcuate embodiment of a textile strap according to the present disclosure;

FIGS. 11A, 11B, 11C and 11D depict an example textile strap in an embodiment of a harness for support of an arm prosthesis according to the present disclosure.

DESCRIPTION

Figure 1:
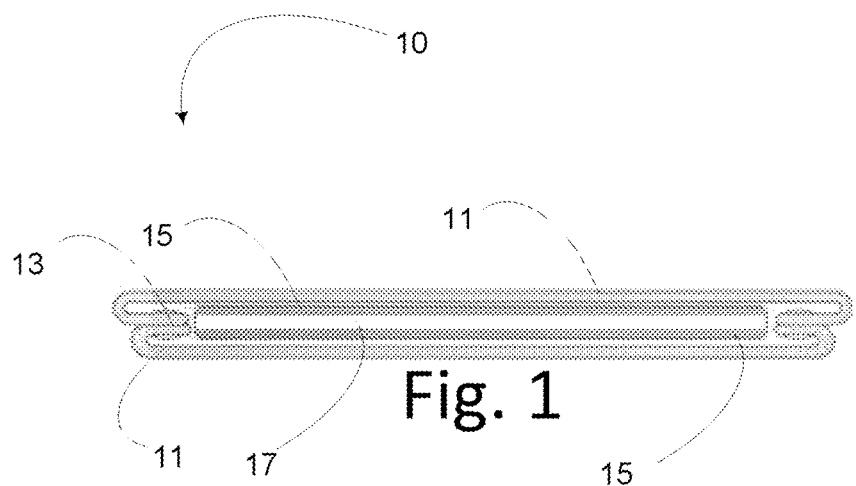
FIG. 1 is a cross-sectional view of an example textile strap comprising a textile matrix according to the present disclosure.
Figure 2:
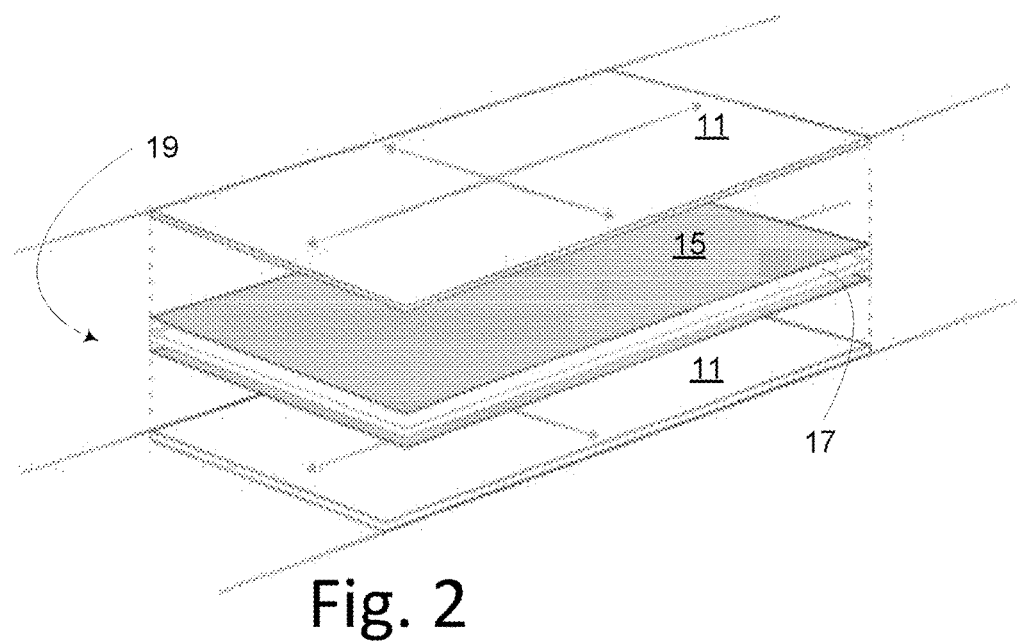
FIG. 2 is a perspective view of the example textile strap of FIG. 1 depicting orientation of alternating first material layers and second material layers to form the textile matrix according to the present disclosure.

FIG. 1 portrays the textile strap 10 comprising a stretch outer shell 11 layer. The stretch outer shell 11 layer comprises at least one swatch having at least one axis across defining a direction in which the stretch outer shell 11 will stretch. This can be advantageously oriented in the same direction as the underlying textile matrix 19 as depicted in FIG. 2.

Knitted fabric is a textile that results from knitting, the process of inter-looping of yarns or inter-meshing of loops. Its properties are distinct from woven fabric in that it is generally able to mechanically stretch, regardless of the stretch characteristics of the fibers with which it is constructed, while woven fabrics can generally only mechanically stretch on the bias.

The yarn in basic knitted fabrics follows a meandering path (a course), forming symmetric loops (also called bights) symmetrically above and below the mean path of the yarn. These meandering loops can be easily stretched in different directions giving knit fabrics much more elasticity than woven fabrics. Depending on the yarn and knitting pattern, knitted garments can stretch as much as 500%. In weaving, in contrast to knitted fabric, fibers are always straight, running parallel either lengthwise (warp threads) or crosswise (weft threads). For this reason, knitting is believed to have been developed for garments that must be elastic or stretch in response to the wearer's motions, such as socks and hosiery. By comparison, woven garments alternately stretch and contract mainly along one or other of a related pair of directions that lie roughly diagonally between the warp and the weft, while contracting in the other direction of the pair (stretching and contracting with the bias), and are not very elastic, unless they are woven from stretchable material such as spandex. Similarly, knit fabrics can be engineered by patterning stitches with different properties to mimic an assembly of fabrics with dramatically different properties in the same single piece.

While generally clothing comfort is believed to be a subjective matter as it depends on the wearers' perception, stretch (often but not always including knit) fabrics have the advantage of being more readily conformable to the body, especially when encompassing a textile matrix 19 with contrasting properties. Comfort is additionally dependent on the interaction between human body with its surrounding microclimate, and also on management of heat and moisture generated by the body, particularly during activities. In hot and humid country, it is important to maintain heat balance of the body to achieve thermo-physiological comfort state or homeostasis and, in this case, temperature homeostasis. In order to achieve temperature homeostasis, the body's heat production must be in equilibrium with the exchange of environment heat. During physical activities, sweating and evaporation carry heat away from the skin. However, any clothing, including a conventional strap, can be the barrier to optimum body heat and moisture loss by impeding evaporation of sweat. Conventional straps also can injure the wearer where such straps contact the body, particularly under weight-bearing loads.

Knitted fabrics are widely used due to their ease in care, high degree of tactile acceptability, and the diversity of comfort-serving functions that can be achieved by the three-dimensional process of knitting. Knitted fabrics also have the ability of liquid moisture transport (i.e., wicking) which, with breathability (i.e., the transport of often water vapor-bearing air away from the wearer) of the fabric, comprise two significant factors that affect the perception of comfort. It is said that thermo-physiological comfort properties of fabric are mainly influenced by fiber type, yarn parameters, fabric characteristics and finishing processes. Due to that fact, the particular characteristics of fiber and finish may be selected to optimize, for example, moisture transport properties as might be dictated by the final application selected to employ the inventive strap.

Air permeability is the rate air flowing passing perpendicularly through a known area under a prescribed air pressure between two surfaces of the material used. Air permeability has strong negative relationships with fabric weight and fabric thickness parameters. Such stands to reason understanding that permeability is achieved through porosity. However there is a negative correlation coefficient between air permeability and course/wale density ratio. Thus, as the fabric weight and fabric thickness increased, it causes the fabric volume per area to increase also to longer paths through the fabric for air to pass. These longer paths obstruct air permeability as the fabric volume per area. Recognizing porosity that plays an important role in air permeability, it too is a factor that can be chosen for a specific application. Air permeability of the fabrics is mainly affected by porosity and type of fabric structures.

In general, liquid moisture transport in textile materials is mainly affected by the moisture absorbency of the fiber content and wicking-ability, which are determined by the capillary action, pathways, and surface tension. Many researchers worked on the improvement of thermal comfort performance in clothing. For example, thermal and moisture management properties of polyester knitted fabrics used in cycling clothes have been measured to compare to structure of the fabrics to select those that were more convenient for the cyclists. Objective fabric evaluations were conducted on thermal resistance, water vapor resistance, air permeability and moisture management properties and it is said that fabrics with good moisture comfort, low water vapor resistance and good moisture management properties were preferred. In this manner, stretch and/or knitted fabrics can be chosen to match the application and environment in which the inventive strap will be used.

The effect of changes on knitting parameters on the moisture management and air permeability of interlock fabrics has been investigated. It was found that the fabric weight, the thickness of the fabric and fabric porosity increased when the machine gauge increased and the stitch length decreased. It was further concluded that loosely knitted fabric samples with higher amount of entrapped air shows good air permeability but poor moisture management properties. Conversely, tighter knitted fabrics demonstrate poorer air permeability but enhanced moisture transporting qualities.

Water vapor permeability properties are crucial factors in determining clothing comfort, as such permeability is essential in transferring perspiration. Selection among fabrics for highest water vapor permeability index value will also result in the highest air permeability result.

Having selected and oriented the stretch outer shell 11, the textile matrix 19 is built up from woven or nonwoven fabrics. Nonwoven fabric is a fabric-like material made from staple fiber (short) and long fibers (continuous long), bonded together by chemical, mechanical, heat or solvent treatment. The term is used in the textile manufacturing industry to denote fabrics, such as felt, which are neither woven nor knitted. Nonwoven fabrics are broadly defined as sheet or web structures bonded together by entangling fiber or filaments (and by perforating films) mechanically, thermally or chemically. Nonwoven fabrics are flat or tufted porous sheets that are made directly from separate fibers, molten plastic or plastic film. Such fabrics are not made by weaving or knitting and do not require converting the fibers to yarn. Typically, a certain percentage of recycled fabrics and oil-based materials are used in nonwoven fabrics. The percentage of recycled fabrics varies based upon the strength of material needed for the specific use. In addition, some nonwoven fabrics can be recycled after use, given the proper treatment and facilities. Nonwoven fabrics are engineered fabrics that may be formed to exhibit specific characteristics. Nonwoven fabrics provide specific functions such as absorbency, liquid repellence, resilience, stretch, softness, strength, flame retardancy, washability, cushioning, thermal insulation, acoustic insulation, filtration, use as a bacterial barrier and sterility. These properties are often combined to create fabrics suited for specific jobs. They can mimic the appearance, texture, and strength of a woven fabric and can be as bulky as the thickest padding.

While nonwoven materials can be used in thermal insulation, filter media, and fluid barriers (properties that are influenced by their void volume), they are used in this application primarily for their lack of stretch. Nonwoven materials frequently function as a fluid barrier, which may be balanced when in use for wearables with regard to heat and moisture management. This can be affected by perforating these nonwoven materials in ways that do not impact their required function.

The textile matrix 19 is a composite structure comprising at least one textile substrate of a first material 15 and one textile substrate of a second material 17 suitably bonded together to form the textile matrix 19. The matrix extends to an edge 21. The layers of textile matrix 19 may include stretch and non-stretch materials, and may include but are not limited to non-woven materials. One or more of the layers could be a membrane material, a woven material, or a plastic or metal mesh material to provide structural support to the matrix 19.

The material layers of composite textile matrix 19 usually serve one, or a combination of, the following purposes:

Provide mechanical support for other structural or filtering layers, giving enhanced durability.

Provide two or more layers of variable permeability and moisture transport efficiency.

Facilitate combination of varied material functions or technologies into a single textile matrix 19.

Additionally, the outer layers serve as a containment to inhibit medium migration, dusting, and particle fallout from the inner layers of the textile matrix 19.

In many situations, where used, the composite nonwovens might fulfill multiple objectives. For example, spunbond nonwoven can act as support layers for textile matrix 19 (such as activated carbon, meltblown and nanofiber webs, microfiber glass and cellulose) as well as protection layer.

In many cases, the role of a component in a composite serving as the second material layer 17 is to provide mechanical support and durability of the first material layer 15. For illustration, although filtration capability by electrospun nanofibers and meltblown nonwovens might be selected as the first layer 15 for comfort as air permeability is very high, while they tend to be weak and are generally too thin to provide significant mechanical support. The mechanical strength of nanofibrous layer/meltblown nonwovens are not sufficient to withstand tensile stresses placed upon materials. Stronger materials are therefore required for the second material layer 17, and materials which have been demonstrated to offer suitable mechanical strength include woven fabric, spunbond, spunlace (hydroentangled), needlepunch felt, or cellulose web.

Most often the combination of structure is made by heat bonding, the bonding process either by heating the process or by using hot melt adhesive. Combination is also possible by ultrasonic welding. Hydro-entanglement and needlepunching are also options for the joining together of two layers to produce the textile matrix 19.

Composites with nanofiber layers are especially attractive as first layer materials 15. These same composites find applications in many critical areas such as medical, hygiene, bioseparation, etc. Where odor is a concern due to harboring moisture, an electrospun membrane is designed to reject microparticles and bacteria, thus preventing bacterial infestation of the textile matrix 19.

Referring again to FIGS. 1 and 2, the orientation of the textile matrix 19 is generally selected to demonstrate tensile strength along a major axis. Importantly, to allow greater flexibility of the resulting textile matrix 19, the first material is selected specifically to stretch along the major axis so that on flexure, the first material layer 15 can stretch and contract while the weight of the supported load is borne mechanically by the second material layer 17. The stretch outer shell 11 then is oriented accordingly, and opposite layers of the stretch outer shell 11 are bonded together at a joint 13 to form an encompassing tube around the textile matrix 19.

Further compliance of the textile matrix 19 is introduced by perforations 22 and apertures 23 that are cut into the textile matrix 19 before encompassing the matrix 19 with the stretch outer shell 11. FIG. 3 illustrates the cut perforations 22 and apertures 23 in the textile matrix 19, as the matrix fits into the stretch outer shell 11. Perforations 22 of the textile matrix 19 enhance breathability of the resulting textile matrix 19. Apertures 23 enhance flexibility of the material layers to ensure compliance and maximal dispersion of weight across supporting tissue. Enhanced flexibility is achieved via removal of material in a systematic pattern. Apart from punch press, rotary pinned, and die cutting, there are several additional methods to remove such material, such as CNC cutting, Waterjet cutting and laser cutting. These cutting methods may be chosen based on a material's given pattern uniformity, edge imperfections or loose fibers, delamination or distortion, and lost or missing features. Non-homogeneous materials, such as those of the first material layer 15 and the second material layer 17 used to build up the textile matrix 19, are selected to avoid a thermal mismatch and delamination between layers. Often these methods require a secondary process to remove edge imperfections and loose fibers.

Simply stated, perforating is the process of making holes in material using a mechanical means to penetrate, or "punch" through the material, leaving behind a hole of particular size and shape. Various factors affect cost and can even affect the feasibility of perforating as an economical means of manufacturing the textile matrix 19.

As stated above, perforations 22 are cut to assure breathability without significantly altering the mechanical support lent by the second material 17. The most common and generally strongest, most economical round hole pattern is a 60-degree stagger. Straight and diagonal (45-degree) patterns are less common, but are available in many common hole sizes. Square and slot perforations are straight side-stagger and end-stagger configurations. Each configuration is suitable for breathability and moisture transport.

As to the apertures 23, the presently preferred embodiment employs rotary cutting technologies for form cutting of textile matrix 19. Using state of the art CNC-technique, almost any imaginable cutting contour can be achieved. Where smaller quantities of apertures are required, such preferred embodiment are mostly die cut with monobloc cutting cylinders made of tool-steel or via magnetic cylinders/flexible dies. Larger quantities may be die cut with segmented tools. High-alloy steel, powder metallurgical steels, or tungsten carbide may be primarily used as cutting segment materials. Die cutting segments may be exchanged easily when damaged. All die cutting materials are equally desirable as counter cutting materials. Half cuts might also be used to perforate or die cut the thickness of the processed material. Some materials may be very thin, while others may be made of several layers partly containing barrier functions.

In one alternative embodiment, the textile matrix is scissor cut. During the scissor cut, the upper knife is pressed with a spring against the edge of the lower knife. Due to the shearing process, a smooth cutting edge is created. This knife system is well-known in the art and mainly used to convert paper, foil, laminates, and cartons in continuous forms and label printing machines, high-performance slitters, as well as special converting systems with high-performance cutting systems. It is equally suitable for cutting apertures 23 based upon first material layer 15 and second material layer 17 selections. Another alternative embodiment may utilize a pressure cut. During the pressure cut, the cutting knife is pressed against a counter surface (i.e., an anvil cylinder). Compared to a scissor cut, the pressure cut displaces the material and in some specific applications, such displacement enhances the resulting textile matrix 19 by providing materials that function as splines within the textile matrix 19.

As is illustrated in FIGS. 4 and 5, the mechanical properties of the textile matrix 19 can be augmented by the inclusion, as in FIG. 4, of a mechanical strap 27 or as in FIG. 5 by the inclusion of metallic or plastic cables 29.

Figure 6:
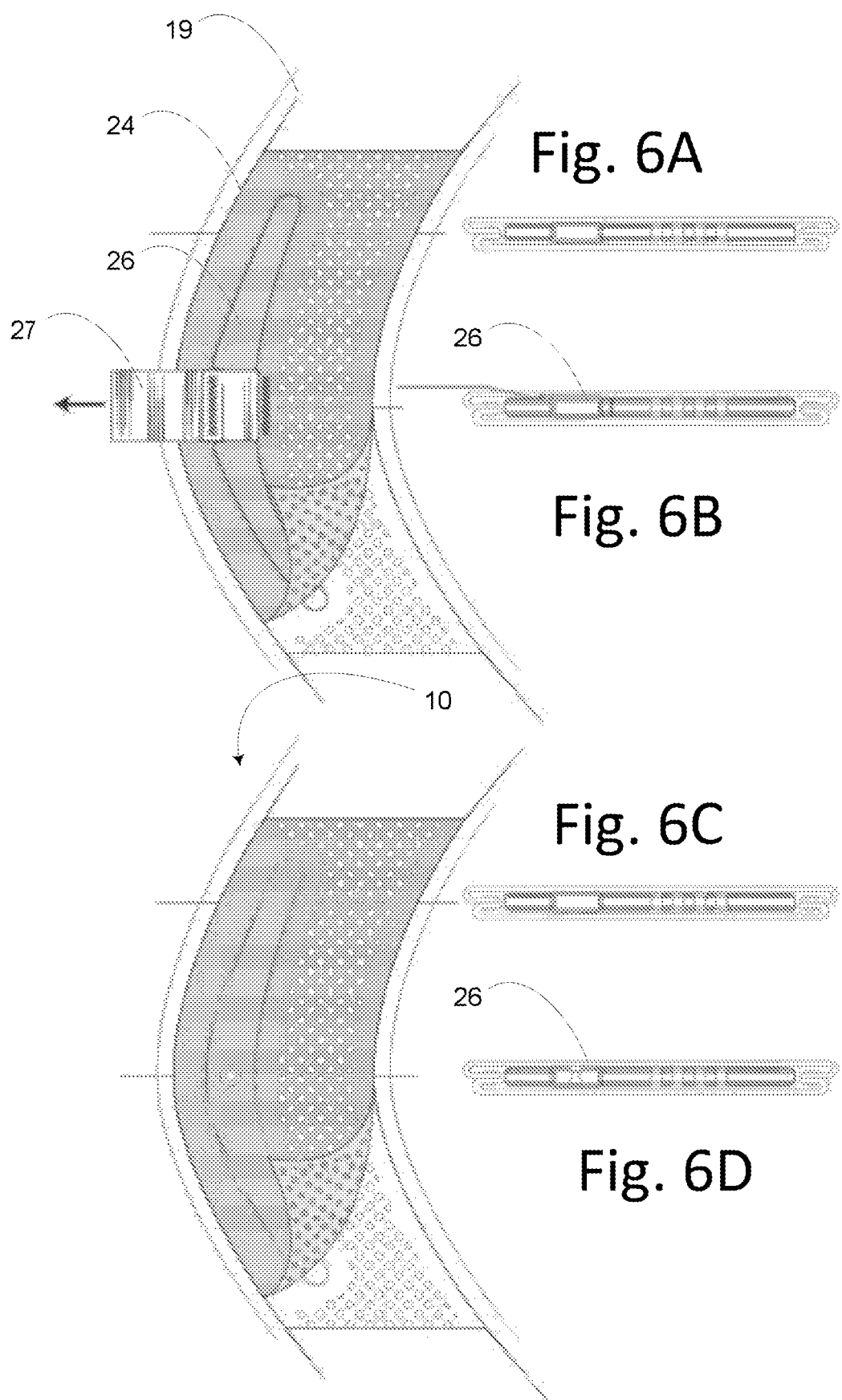

While thus far, the form of the textile strap 10 has been illustrated as a single straight band, nothing so limits this disclosure. As shown in FIG. 6, the strap 10 can be formed as an arcuate sector to embrace a user's shoulder. In an alternate embodiment as shown in FIG. 6, the textile matrix 19 may be interrupted by the inclusion of specific edge padding 24 or, where a specific rigidity is appropriate to enhance the structure of the textile strap 10, the matrix may be interrupted to include a stiffener plate 26 for a load bearing strap attachment (e.g., for mechanical strap 27) as shown in each of FIGS. 6A, 6B, 6C, and 6D.

Figure 7:
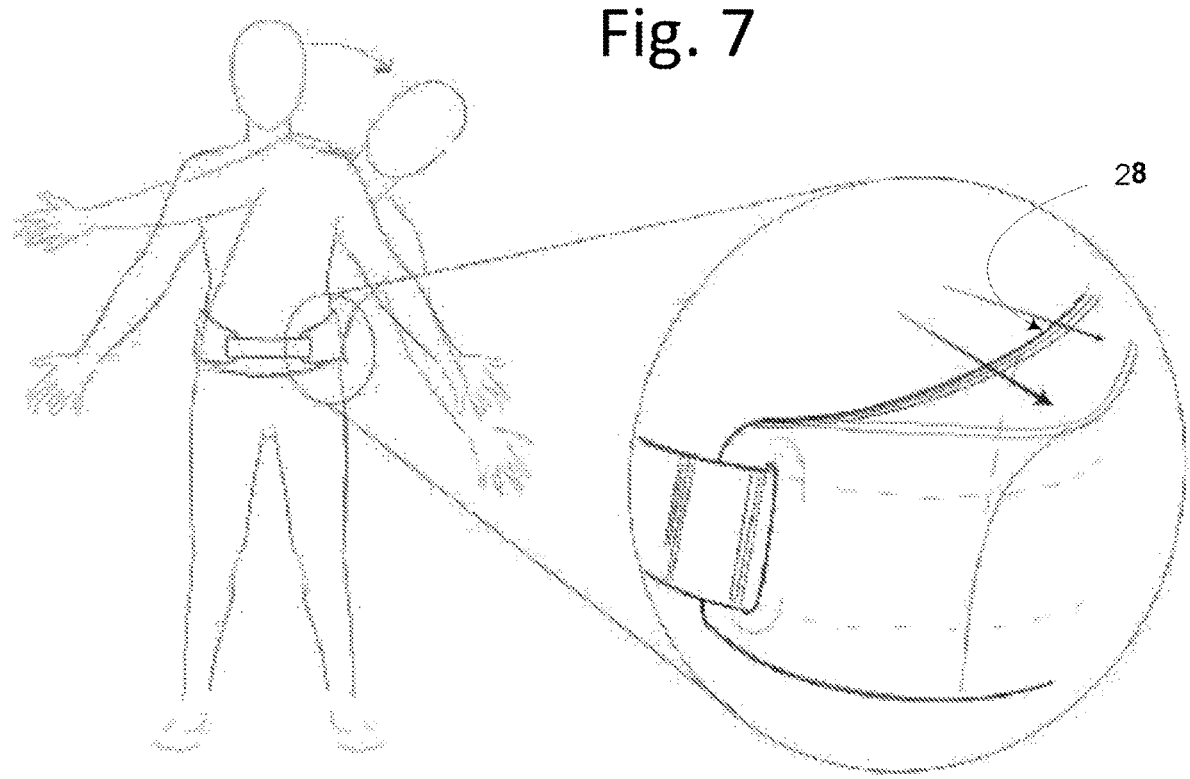
FIG. 7 depicts a flexible belt made of a textile strap according to the present disclosure.
Figure 8:
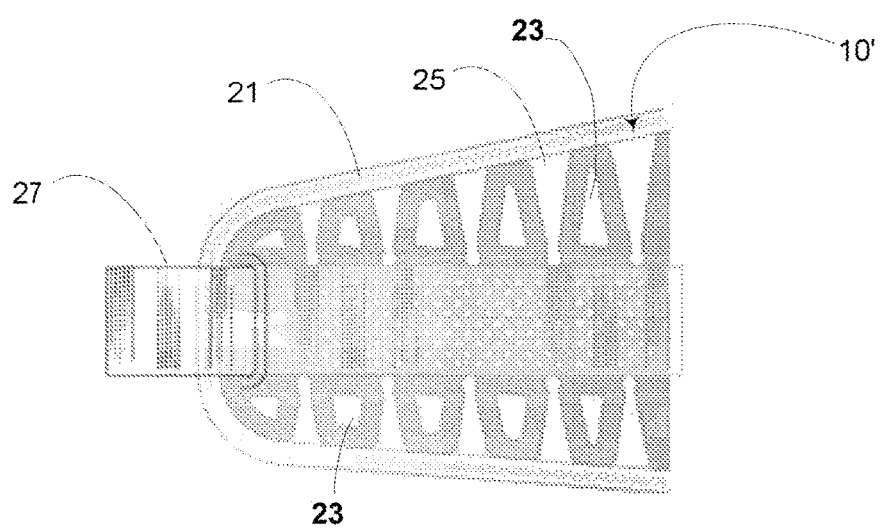
FIG. 8 depicts an alternate embodiment of a textile strap according to the present disclosure.

It is also not necessary to have the textile matrix 19 extend uniformly to the edge of any designed textile strap 10. In the instance of a belt application at the hips such as shown in FIG. 7, it may be advantageous to stagger a layer of the second layer material 17 to create a variable compliance of the belt as the belt surrounds the hips at the crown of the hip, indicated at 28. In this fashion, the belt presents a softer interface to allow movement of the crown of the hip beneath the matrix 19. As seen in FIG. 8, the gaps 25 are the sites of removed material between fingers defined by textile matrix 19. While tensile strength and tension can be applied to the interior mechanical strap 27 as depicted in FIG. 4, the pattern of gaps 25 is chosen to remove more material in the proximity to the edge 21, where the proportion of material removed decreases as a function of distance from the edge 21.

Figure 9A:
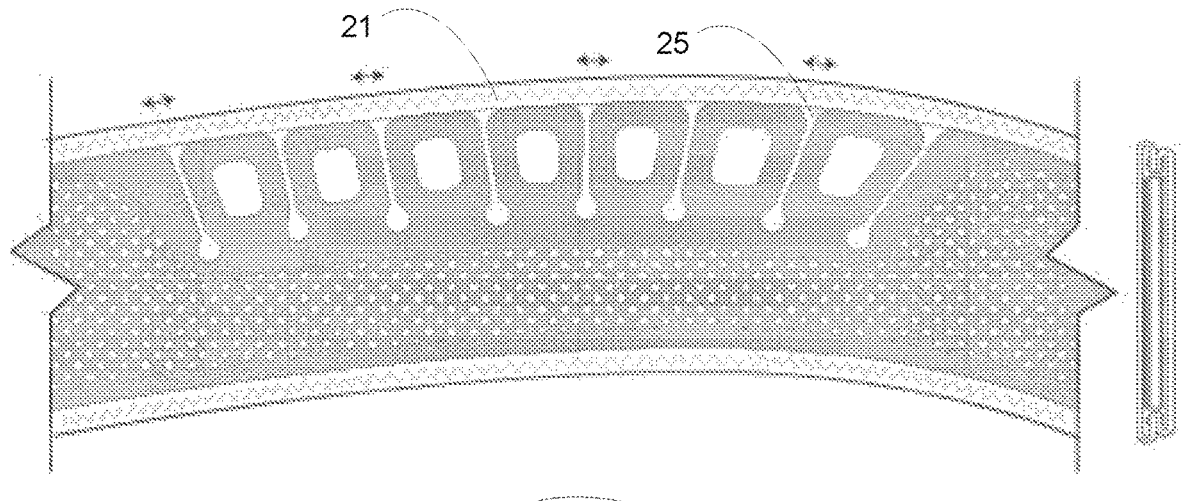
FIGS. 9A and 9B show a textile matrix in unflexed and flexed positions according to the present disclosure.
Figure 9B:
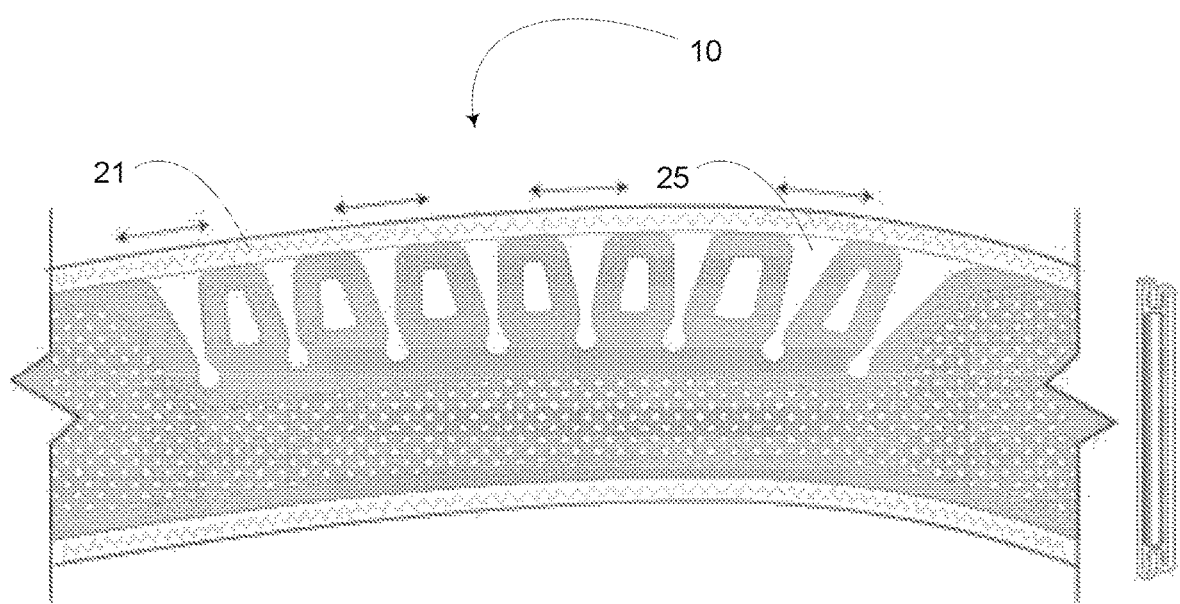

The contrast between FIGS. 9A (unflexed) and 9B (flexed) demonstrates the advantage of textile straps 10 of the inventive design. The geometry of the straps is configured to resist flexure in any direction but by its narrowest dimension, i.e., bending onto itself. For example, a conventional belt may be readily wrapped around a waist of a wearer, but will resist an upward or downward flexure. Indeed, it is this characteristic of belts that makes them suitable for carriage of holsters. A belt resists the downward pull of a holster thereby supporting the weight of the weapon the holster carries.

By cutting openings such as aperture 25 and/or gaps 25 in the textile matrix 19, the resulting textile strap 10 is less resistant to flexure. When flexed, the gaps 25 allow finger elements of the textile strap 10 to fan out thereby lowering, significantly, the stiffness along its length.

Figure 10A:
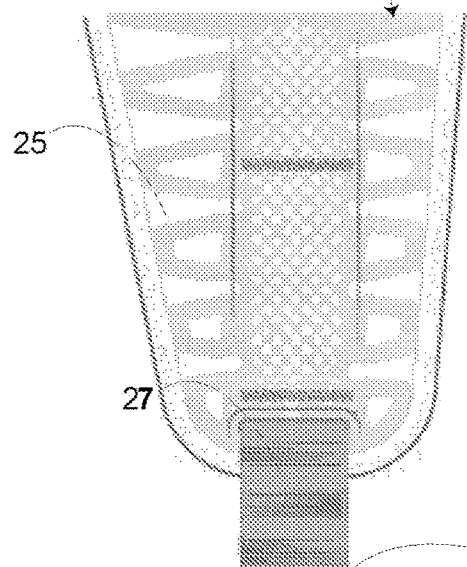
FIGS. 10A, 10B, 10C and 10D show alternative embodiments of tensioning members according to the present disclosure.
Figure 10B:
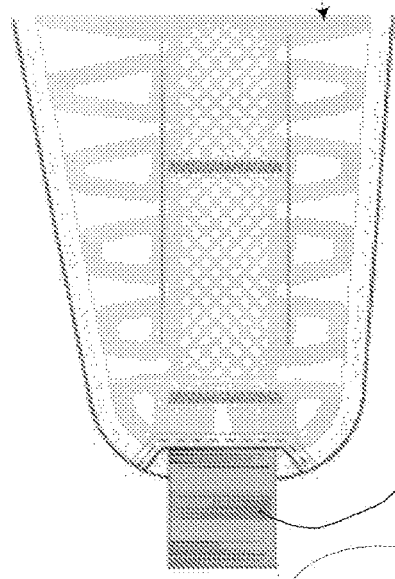
Figure 10C:
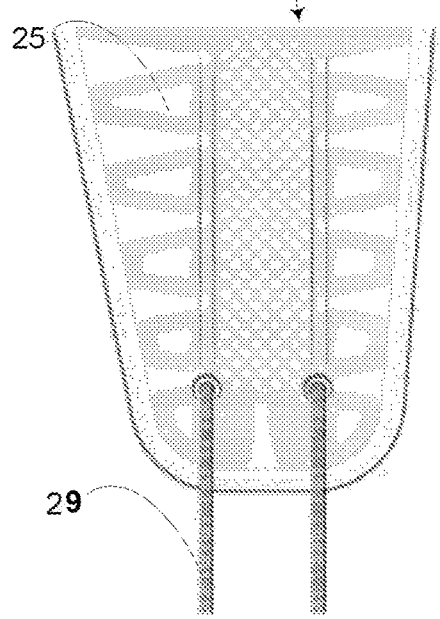
Figure 10D:
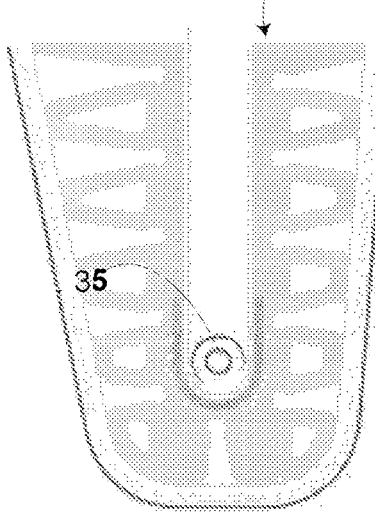

FIGS. 10A, 10B, 10C, and 10D show various embodiments wherein the textile matrix 19 is configured to include various tensioning arrangements. In FIG. 10A, interior strap 27 as shown in FIG. 4 is incorporated in the textile matrix 19 and allowed to slide within a channel (not shown) that encompasses the textile matrix 19. In this fashion, the matrix 19 may slide as necessary to accommodate any supported load. Alternately in FIG. 10B, interior strap 27 is fixed relative to the matrix 19, where fixation of the matrix relative to interior strap 27 is selected to be advantageous in the application. FIG. 10C depicts the cables 29 as depicted in FIG. 5 within the textile matrix 19, serving the same purpose as interior strap 27 that is shown in FIGS. 10A and 10B. Finally, in another embodiment shown in FIG. 10D, the cables 29 can include a rotary bobbin 35 that tensions the cables 29 within the matrix 19 without requiring external access to the cables 29.

In one particular embodiment of the inventive textile strap 10, the particular advantages discussed above are brought to bear in the context of a harness to secure a prothesis for a user. As shown in FIGS. 11A and 11B, a harness 30 for conventional prothesis might be formed of arcuate textile straps 33 and anchoring straps 31. As such, these arcuate straps are configured to flex as discussed herein relative to FIG. 6. As shown in FIG. 11D, apertures 23 and gaps 25 are cut in the textile matrix 19 to allow flexure of arcuate straps 33', as show in FIGS. 11A and 11G, which are flexed where the anchor straps 31 bear a prothesis (not shown). The forces f (indicated in FIG. 11C) suitably distort the arcuate textile straps 10 to flex in response to those forces.

The embodiments of the invention in which an exclusive property or privilege is claimed are defined as follows:

1. A textile strap, comprising:
    a stretch outer shell comprising stretch fabric, wherein the stretch outer shell is configured to be water vapor permeable, wherein the stretch outer shell comprises two opposite layers that are bonded together at a joint; and
    a textile matrix formed of non-stretch material, wherein the textile matrix has a maximum tensile strength along a major axis of the textile matrix, wherein the textile matrix is positioned between the two opposite layers of the stretch outer shell such that the stretch outer shell surrounds and encompasses the textile matrix within a channel of the stretch outer shell, such that the textile matrix is configured to slide within the channel of the stretch outer shell in response to loads applied to the textile strap, wherein the textile matrix comprises a plurality of perforations formed through the textile matrix, wherein the plurality of perforations are configured to enhance breathability and wicking of the textile matrix, wherein the textile matrix comprises a plurality of apertures formed through the textile matrix, wherein the plurality of apertures are configured to increase flexibility and compliance of the textile matrix and create a gradient of stretch across a zone of the textile matrix, and wherein the zone is proximate to an edge of the textile matrix, the textile matrix comprising:
        a first textile substrate configured to stretch along the major axis of the textile matrix; and
        a second textile substrate bonded to the first textile substrate, wherein the second textile substrate is configured to provide mechanical support to and increase durability of the first textile substrate.

2. The textile strap according to claim 1, wherein the stretch outer shell is oriented with respect to the textile matrix such that the stretch outer shell is configured to stretch along the major axis of the textile matrix.

3. The textile strap according to claim 1, further comprising a mechanical strap positioned within the channel of the stretch outer shell, wherein the mechanical strap is configured to slide within the channel, and wherein the mechanical strap is configured to tension the textile strap.

4. The textile strap according to claim 1, further comprising a mechanical strap positioned within the channel of the stretch outer shell, wherein the mechanical strap is fixed with respect to the textile matrix, and wherein the mechanical strap is configured to tension the textile strap.

5. The textile strap according to claim 1, further comprising one or more elongate cables extending through the channel of the stretch outer shell, wherein the one or more elongate cables are configured to tension the textile strap.

6. The textile strap according to claim 5, further comprising a rotary bobbin coupled to the textile strap and engaged with the one or more elongate cables such that the rotary bobbin is configured to tension the one or more elongate cables without external access to the one or more elongate cables.

7. The textile strap according to claim 1, wherein one selected from the group consisting of the first textile substrate and the second textile substrate comprises a woven fabric, wherein the other of the group consisting of the first textile substrate and the second textile substrate comprises a nonwoven fabric, and wherein the woven fabric and the nonwoven fabric have similar coefficients of thermal expansion, and wherein the woven fabric and the nonwoven fabric are configured to be bonded together and resist delamination.

8. The textile strap according to claim 1, wherein the plurality of perforations are arranged in an array comprising a plurality of rows of perforations, wherein each perforation of the plurality of perforations is substantially equally sized, shaped, and spaced apart from one another, wherein each respective aperture of the plurality of apertures is more than twice as large as each respective perforation of the plurality of perforations, and wherein each aperture of the plurality of apertures widens as the respective aperture extends inward from an edge of the textile matrix.

9. The textile strap according to claim 1, wherein the textile matrix defines a plurality of fingers, wherein each respective finger of the plurality of fingers is separated from an adjacent respective finger via a respective gap, wherein a respective aperture of the plurality of apertures is formed in each respective finger of the plurality of fingers, and wherein the plurality of fingers are configured to fan out in response to tension applied to the textile matrix.

10. The textile strap according to claim 1, wherein the textile strap comprises an arcuate sector configured to embrace a shoulder of an operator.

11. The textile strap according to claim 1, further comprising edge padding that interrupts the textile matrix, wherein the edge padding is positioned adjacent an edge of the textile matrix, and wherein the edge padding is spaced apart from the plurality of perforations.

12. The textile strap according to claim 1, further comprising a stiffener plate configured for attachment of a load bearing strap.

13. The textile strap according to claim 1, wherein the first textile substrate and the second textile substrate are staggered to create variable compliance in the textile strap adjacent an edge of the textile matrix.

14. The textile strap according to claim 1, incorporated into one or more selected from the group consisting of a duty belt, a police holster, a military belt, and a climbing harness.

15. A harness configured to secure a prosthetic device for an operator, the harness comprising:
one or more arcuate textile straps, wherein each arcuate textile strap comprises the textile strap according to claim 1; and
one or more anchoring straps configured to anchor the one or more arcuate textile straps to the operator's body.

* * * * *